Oct. 20, 1925.

E. FEUGÈRE

SEPARATOR

Filed Oct. 14, 1922

1,558,004

Inventor:
Ernest Feugère

Patented Oct. 20, 1925.

1,558,004

UNITED STATES PATENT OFFICE.

ERNEST FEUGÈRE, OF BOULOGNE-SUR-SEINE, FRANCE.

SEPARATOR.

Application filed October 14, 1922. Serial No. 594,531.

*To all whom it may concern:*

Be it known that I, ERNEST FEUGÈRE, citizen of the French Republic, residing at 200 bis Boulevard Jean-Jaures, Boulogne-sur-Seine, France, have invented certain new and useful Improvements in Separators, of which the following is a specification.

My invention relates to a separator which is intended to prevent water and any impurities that may be found in the carburetting material passing from the reservoir to the motor.

For this purpose, a float arranged in the bottom of a receptacle which constitutes the body of the separator controls a valve enabling the water to be discharged through a pipe. This float is made so that it cannot be raised except by the water which is heavier than the carburetting material and consequently collects in the bottom of the receptacle.

Figure 1:
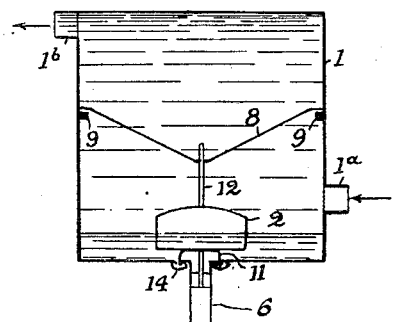
Figure 2:
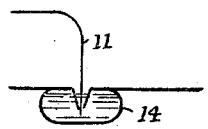

In the accompanying drawing diagrammatically illustrating my invention by way of example, Fig. 1 is a sectional view of an embodiment of my new separator, Fig. 2 a detail view on a larger scale of a portion of the apparatus and Fig. 3 a detail view of the partition mentioned hereinafter.

1 indicates the casing with its admission pipe 1$^a$ and its discharge pipe 1$^b$. In the bottom of the casing is provided a float 2. This float is made hollow or of some light substance, the density of which assures its power of floating on the water, whilst it is immersed in the carburetting material.

Figure 3:
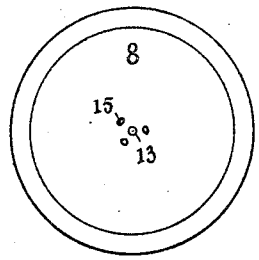

8 is a partition of saucer-shape resting on a rib 9 and having a central opening 13 in its bottom (Fig. 3). The float 2 carries on its lower face a bell 11 above the opening of the pipe 6. A central rod 12, fixed to the upper part of the float engages in the central opening formed in the bottom of the partition 8 so as to guide and centre the float.

As shown, the bell 11 surrounding pipe 6 dips into an annular vessel 14, filled with a liquid of great density intended to form a tight joint. This vessel is so shaped as to prevent the liquid (mercury for example) from being spilled even during a considerable inclination or when there is violent shaking.

The operation is as follows:

The petrol, spirit or other carburetting material enters the casing 1 through the pipe 1$^a$. The water which may be contained in the spirit being heavier, accumulates at the bottom. The float 2 arranged to float only on the water and not on the liquid fuel, rises only when a certain quantity of water has accumulated in the bottom of the receptacle, thus raising the float 2 and bell 11 and letting the water escape through the pipe 6.

When the water has escaped, the float, by reason of its being too heavy to float in the liquid fuel, descends, again, and the bell 11 again closes pipe 6.

The liquid fuel which traverses the bottom of the partition 8 is freed of all impurities which are arrested by this partition. This latter (Fig. 3) has perforations 15 enabling impurities which might have been able to pass to descend towards the bottom of the receptacle. The central hole 13 only serves as a guide for the rod 12 of the float.

Obviously, the various constituent parts of this separator can be replaced by others, functioning in the same way, or giving the same result. It is understood also that any material and any product capable of being employed in the construction of these apparatus may be utilized.

I claim:

In a separator for treating carburetting liquid, the combination with a casing having an inlet and a discharge pipe attached thereto, of a float in said casing of greater specific gravity than the carburetting material, but less than water, and equipped with a rod, a bell provided on the lower face of said float and adapted to close the said discharge pipe, an annular vessel provided on the said casing and containing a liquid of great density, and adapted to receive the lower rim of the said bell thereby forming a water tight seal around the same, thus preventing the liquid in the vessel from being spilled, and a partition in said casing having a central opening therein for said rod and forming a guide therefor.

In testimony whereof he has affixed his signature.

ERNEST FEUGÈRE.